United States Patent
Colomer et al.

(10) Patent No.: US 11,156,854 B2
(45) Date of Patent: Oct. 26, 2021

(54) PROGRESSIVE OPHTHALMIC LENS

(71) Applicant: HORIZONS OPTICAL, S.L.U., Barcelona (ES)

(72) Inventors: Pau Artus Colomer, Barcelona (ES); Gloria Casanellas Peñalver, Barcelona (ES); Rafael Perpiñan Blasco, Barcelona (ES)

(73) Assignee: HORIZONS OPTICAL, S.L.U., Barcelona (ES)

( * ) Notice: Subject to any disclaimer, the term of this patent is extended or adjusted under 35 U.S.C. 154(b) by 133 days.

(21) Appl. No.: 16/530,334

(22) Filed: Aug. 2, 2019

(65) Prior Publication Data

US 2021/0033888 A1 Feb. 4, 2021

(51) Int. Cl.
*G02C 7/06* (2006.01)

(52) U.S. Cl.
CPC .................. *G02C 7/066* (2013.01)

(58) Field of Classification Search
CPC ........ G02C 7/061; G02C 7/063; G02C 7/027; G02C 7/066; G02C 7/06; G02C 7/068; G02C 7/024; G02C 7/065; G02C 7/028; G02C 2202/24; G02C 7/041; G02C 2202/20; G02C 7/022; G02C 7/025; G02C 7/044; G02C 2202/08; G02C 7/02; G02C 2202/16; G02C 7/04; G02C 7/042; A61F 2/1618; A61F 2/1637; A61F 2/145; A61F 2/1451; A61F 2/16; A61F 2/1613; A61F 2002/1681; A61F 2240/002; A61F 2250/0082; A61F 2/14; A61F 2/1602; A61F 2/1616; A61F 2/1654; A61F 2/1656; A61F 9/00; B32B 2037/243; B32B 2038/168; B32B 2307/402; B32B 2307/4026; B32B 2307/412; B32B 2317/18; B32B 2323/00; B32B 2333/04; B32B 2367/00; B32B 2369/00; B32B 2375/00; B32B 23/00;

(Continued)

(56) References Cited

U.S. PATENT DOCUMENTS

| | | | | |
|---|---|---|---|---|
| 5,488,442 | A | * | 1/1996 | Harsigny ............... G02C 7/061 351/159.42 |
| 2002/0180928 | A1 | * | 12/2002 | Ahsbahs ............... G02C 7/063 351/159.42 |

(Continued)

*Primary Examiner* — William R Alexander
*Assistant Examiner* — Sharrief I Broome
(74) *Attorney, Agent, or Firm* — Amster, Rothstein & Ebenstein LLP

(57) ABSTRACT

A progressive ophthalmic lens includes at least one multi-focal surface, in which at each point of its surface, an astigmatism value and a gradient of astigmatism value can be measured, the lens including: a far-vision zone with a reference point (FV), a near-vision zone with a reference point (NV), an intermediate vision zone with a progression path that connects the far vision zone and the near vision zone, a foveal projection, and a para-foveal projection, and said lens defining a lens addition. When the lens addition is different than 2.00 D, the astigmatism value is k*Add*0.41 D, where Add indicates the lens addition and k is 0.5 and, if the progression path is shorter than 15 mm, the maximum astigmatism value of the foveal projection is (−0.03*d) D/mm+0.86 D, and when the lens progression path is larger than 15 mm, the maximum astigmatism value of the foveal projection is (−0.02*d) D/mm+0.71 D.

8 Claims, 8 Drawing Sheets

(58) Field of Classification Search
CPC ..... B32B 2551/00; B32B 27/08; B32B 27/18; B32B 27/20; B32B 27/308; B32B 27/325; B32B 27/36; B32B 27/365
See application file for complete search history.

(56) References Cited

U.S. PATENT DOCUMENTS

| | | | |
|---|---|---|---|
| 2007/0035696 A1* | 2/2007 | Altheimer | G02C 7/061 351/159.42 |
| 2013/0038833 A1* | 2/2013 | Berthezene | G02C 7/063 351/159.42 |
| 2016/0011436 A1* | 1/2016 | Contet | G02C 7/027 351/159.42 |
| 2018/0299697 A1* | 10/2018 | Heslouis | G02C 7/066 |

* cited by examiner

PROGRESSIVE OPHTHALMIC LENS

The present invention refers to a progressive ophthalmic lens that considers physiological data from retina.

BACKGROUND OF THE INVENTION

Presbyopia is a limited capacity of the accommodation power of the eye that increases with the age. Therefore, lenses with different optical power for far, intermediate, and near vision are usually proposed to correct presbyopia.

Progressive ophthalmic lenses (PAL) are lenses that have an upper zone with optical correction for distance vision, a lower zone with correction for near vision, and an intermediate zone with a gradually varying optical power, known as progression path or corridor.

The near-vision zone has a more positive optical power than the far-vision zone, and the difference in power between the far and near vision correction is known as addition. In general, the design of these lenses is intended to make the transition between far and near optical power as smooth as possible.

According to a mathematical limitation described by G. Minkwitz in 1963 "*Uber den Flachenastigmatismus bei gewissen symmetrischen Aspharen*", *Optica Acta.* 10(3): 2223-227), undesired lateral aberrations always appear on either sides of the corridor in the form of astigmatism due to the continuous variation of the power in progressive lenses.

In the design of the progressive lenses, designers try to minimize and re-distribute the unwanted astigmatism by positioning it in such a way that the lens optical quality in the far, intermediate and near vision areas is as high as possible, and the lateral zones have the minimum possible astigmatism.

Optical designs can be represented by iso-power lines (points in the lens with identical optical power) and iso-astigmatic lines (points in the lens with identical optical astigmatism).

From a histological perspective, the macula is an oval-shaped area near the center of the of the human eye and some other animal eyes. The macula in humans has a diameter of around 5.5 mm (viewing path of 18° approx.) and is subdivided into the umbo, foveola, foveal avascular zone, fovea, parafovea, and perifovea areas (FIGS. 1 and 2).

The fovea is described as a depression in the inner retinal surface, about 1.5 mm wide, the photoreceptor layer of which is composed entirely of cones and which is specialized for maximum visual acuity. Parafovea is a region in the retina that circumscribes the fovea, about 2.5 mm wide. The angle of the foveal and parafoveal vision following the eye viewing path, corresponds to 5° and 8°, respectively (FIG. 3). ("*A dynamical model of saccade generation in reading based on spatially distributed lexical processing*", Engbert, R., Longtin, A., Kliegl, R. *Vision Research Vol.* 42 March 2002).

Optimal optical lens performance is required in the foveal and para-foveal vision of the eye, therefore image aberrations should be almost zero particularly along the progression path of the lens and its nearby, where images will focus in the foveal region. Precise para-foveal view is particularly relevant for reading activities, where images in the nearby of the focus are identified (FIG. 4).

Beyond macular region, the rest of the retina is also sensitive to light stimuli. But since the photodetector cell density is lower in the peripheral retina, image perception is not precise. Nevertheless, peripheral retinal area is responsible of motion perception.

Peripheral vision is divided into different regions according to sensitivity to different stimuli according to:

Far periphery extends from 60° to 94° and is only sensitive to motion

Mid periphery extends from 30° to 60°, can detect motion and color

Near periphery extends from 10° to 30° and is sensible to motion, color and shape The field of view is modified by the lenses fitted in spectacles, with an important reduction depending on the frame dimensions and the lens power. Therefore, the effective visual field is normally reduced to less than 45° on each eye.

The periphery of the lens is used in peripheral vision, where perfect image quality is not required since this area is important in motion perception and object detection. While the progressive lens lateral astigmatism cannot be eliminated in the periphery, variation of this astigmatism is known to be more important than its absolute value for the motion perception and object detection (Essilor; Designing Progressive Addition Lenses, Essilor Academy).

Several progressive lens calculation techniques are known in the state of the art, particularly, ray tracing techniques, and numerical optimization methods combined with the finite element method. The surface of the lens can be modeled with a mesh of points represented by b-splines or Zernike polynomials, for which certain conditions are imposed on the points of the mesh. Power error, unwanted astigmatism, and gradient of power and astigmatism or their combinations are also minimized in a merit function that evaluates the overall optical performance of the lens. Optical functions optimized in the merit function, can be weighed according to the lens designer criteria that decide the relative importance of the optical functions in each different lens area, as in WO2018193147A1.

Despite lens designers try to obtain lenses with optimum optical quality in far vision area and near vision area by widening the field of view in these areas and lowering gradients of astigmatism in peripheric vision, progressive addition lenses in the market are not perfectly fulfilling the ideal targets because of the limitations established by Minkwitz.

Therefore, it is not a surprise that some wearers claim they do not feel comfortable with the quality of their progressive addition lenses, particularly in activities where near or intermediate vision zones are intensively used, like reading, or in computer activities, or more likely where peripheric vision or motion perception is required (driving, sports, etc.). According to studies of non-adaptation of progressive lenses, some 5% to 8% of users do not adapt satisfactorily to progressive lenses (J. J Conejero in "*Análisis de la adaptación de lentes progresivas para la corrección de la presbicia*", 2012) their main complaint is related to bad near and intermediate vision, particularly because of lateral distortions caused by the aberrations in the form of unwanted astigmatism, both its gradient and its absolute value.

Some niche products are offered as a solution for specific tasks, like office, work, driving or leisure activities. While these occupational lenses can be optimized for either near, mid or far vision and achieve lower amounts of lateral astigmatism, they cannot be used for any vision activity because the addition profile along the progression path does not allow all-distance focusing. On the contrary, common progressive addition lenses that are designed for multipurpose tend to have a balanced performance since they are designed for all situations and tasks.

This invention refers to multipurpose progressive lenses and to occupational progressive lenses. In order to correctly compare features of both types of progressive lenses the definitions of corridor length and addition will need to be adapted for occupational progressives.

SUMMARY OF THE INVENTION

Therefore, the purpose of the present invention is to provide a progressive ophthalmic lens with optimum vision quality, in which physiological data derived from foveal, para-foveal and macular vision are evaluated and included in the progressive lens design and optimization process according to specific metrics that evaluate the optical performance of the lens in foveal, para-foveal and peripheric vision. This new approach has been proven to overcome the limitations expressed by the progressive lens users.

Firstly, some definition of the terms used in the present description and the claims are provided:

"Acuity metric" is related to foveal vision acuity and evaluates the maximum value of the astigmatism and gradient of astigmatism in the lens region where the fovea and para-fovea are projected along the progression path.

"Peripheral metric" is related to peripheral vision quality and evaluates the maximum value of the astigmatism and gradient of astigmatism in the region comprised by the solid angle of 45° centered at the fitting point of the lens.

Definitions relevant to the Acuity metrics are the following:

Progression path is a line or an area (because it has a width defined as foveal projection along the progression path) in the lens that connects the far vision zone and the near vision zone and is defined as 3 straight lines joined as detailed in FIG. 7. A first segment goes from 4 mm above the fitting cross to the fitting cross, the second segment goes from the fitting cross to the near vision point and the third segment goes from the near vision point to 2 mm below the near vision point. For exact description of the fitting cross and near vision points see ISO 13666:2019 Ophthalmic optics—Spectacle lenses—Vocabulary Foveal aperture is the eye entrance aperture that reaches the fovea. It is characterized by a cone of 5° aperture approx. lying in the line of sight, such that the cone apex lies on the eye principal plane—as defined in paraxial optics—and the cone base center lies on the line of sight, (FIG. 6a, inner dotted line).

Para-foveal aperture is the eye entrance aperture that reaches the para-fovea. It is characterized by a cone of 8° aperture approx. lying in the line of sight, such that the cone apex lies on the eye principal plane—as defined in paraxial optics—and the cone base center lies on the line of sight—, (FIG. 6a, inner dotted line).

Lens foveal projection along the progression path is the lens area resulting in the intersection of the foveal aperture cone with the internal lens surface. Dimensions of this area depend on how far from the eye the lens is situated and the length of the progression path, but for a 15 mm progression path and 12 mm back vertex distance, it is 50 mm² approx.

Lens para-foveal projection along the progression path is the lens area resulting in the intersection of the para-foveal aperture cone with the internal lens surface. Dimensions of this area depend on how far from the eye the lens is situated and the length of the progression path, but for a 15 mm progression path and 12 mm back vertex distance, it is 70 mm² approx.

Maximum value of astigmatism for lens foveal projection is the absolute maximum of all values of astigmatism within the area of the lens foveal projection. Similarly, a concept for maximum of gradient of astigmatism is defined.

Maximum value of astigmatism for lens para-foveal projection is the absolute maximum of all values of astigmatism within the area of the lens para-foveal projection. Similarly, a concept for maximum of gradient of astigmatism is defined.

The present invention refers to a progressive ophthalmic lens according to the independent claims. Embodiments of the progressive ophthalmic lens are provided in the dependent claims.

In particular, the progressive ophthalmic lens comprises at least one multifocal surface, in which at each point of its surface an astigmatism value and a gradient of astigmatism value can be measured, the lens comprising:
 a far-vision zone with a reference point (FV),
 a near-vision zone with a reference point (NV),
 an intermediate vision zone with a progression path that connects the far vision zone and the near vision zone,
 a foveal projection onto the lens surface, and
 a para-foveal projection onto the lens surface,
 and said lens defining a lens addition,
 wherein
 in an area covered by the foveal projection along the progression path, the maximum astigmatism value is less than 0.41 diopters:
 if the lens addition is different than 2.00 D, the astigmatism value is $k*\text{Add}*0.41 \text{ diopters},$ being Add the lens addition and k a constant being 0.5 and,
 if the progression path is shorter than 15 mm, the maximum astigmatism value of the foveal projection is substituted by $(-0.03*d)$ D/mm+0.86 D,
 if the lens progression path is larger than 15 mm, the maximum astigmatism value of the foveal projection is substituted by $(-0.02*d)$ D/mm+0.71 D,
and wherein
 in an area covered by the para-foveal projection along the progression path, the maximum gradient of astigmatism value is less than 0.29 D/mm, and
 if the lens addition is different than 2.00 D, the gradient of astigmatism value is $k*\text{Add}*0.29 \text{ D/mm}$ being Add the lens addition and k a constant being 0.5 and
 if the progression path is shorter than 15 mm, the maximum gradient of astigmatism value of the para-foveal projection is by $(-0.08*d)$ D/mm²+1.49 D/mm, whereas if the progression path is larger than 15 mm, the maximum gradient of astigmatism value of the para-foveal projection is $(-0.01*d)$ D/mm²+0.44 D/mm.

Furthermore, in a lens region determined by the intersection of a 45° aperture angle cone with its apex on the eye principal plane and its center placed at the lens fitting point, the absolute value of the difference of the maximum values of gradient of astigmatism in either side of the progression path is lower than 0.06 D/mm, and
 if the lens addition is different than 2.00 D, the difference of maximum values of gradient of astigmatism in each side of the progression path is lower than $k*\text{Add}*0.06 \text{ D/mm}$ being Add the lens addition and k a constant being 0.5 and if the progression path is different than 15 mm, the difference of maximum values of gradient of astigmatism in each side of the progression path is lower than (−0.01*d) D/mm²+0.21 D/mm.

Preferably, in a lens region determined by the intersection of a 45° aperture angle cone with its apex on the eye principal plane and its center placed at the lens fitting point, the maximum value of the gradient of astigmatism is lower than 0.34 D/mm, and if the lens addition is different than 2.00 D, the maximum value of the gradient of astigmatism is lower than $$k*\text{Add}*0.34 \text{ D/mm}$$

being Add the lens addition and k a constant being 0.5 and
if the progression path is shorter than 15 mm, the maximum value of the gradient of astigmatism is lower than (−0.07*d) D/mm²+1.39 D/mm, whereas if the progression path is larger than 15 mm, the maximum value of the gradient of astigmatism is lower than (−0.02*d) D/mm²+0.64 D/mm.

Also preferably, in a lens region determined by the intersection of a 45° aperture angle cone with its apex on the eye principal plane and its center placed at the lens fitting point, the maximum value of the astigmatism is lower than 1.60 D, and if the lens addition is different than 2.00 D, the maximum value of astigmatism is lower than $$k*\text{Add}*1.60 \text{ D}$$

being Add the lens addition and k a constant being 0.5 and
if the progression path is shorter than 15 mm, the maximum value of the astigmatism is lower than (−0.05*d) D/mm+2.35 D, whereas if the progression path is larger than 15 mm, the maximum value of the astigmatism is lower than (−0.03*d) D/mm+2.05 D.

The present invention also refers to a progressive ophthalmic lens comprising at least one multifocal surface, in which at each point of its surface an astigmatism value and a gradient of astigmatism can be measured, and the lens comprising:
- a far-vision zone with a reference point (FV),
- a near-vision zone having a reference point (NV),
- an intermediate vision zone with a progression path that connects the far vision zone and the near vision zone,
- a foveal projection onto the lens surface, and
- a para-foveal projection onto the lens surface,
- and said lens defining a lens addition, wherein
in an area covered by the foveal projection along the lens progression path, the maximum astigmatism value if less than 0.41 diopters:
if the lens addition (Add) is different than 2.00 D, the astigmatism value is $$k*\text{Add}*0.41 \text{ D},$$

being Add the lens addition and k a constant being 0.5 and,
if the progression path is shorter than 15 mm, the maximum astigmatism value of the foveal projection is (−0.03*d) D/mm+0.86 D,
if the progression path is larger than 15 mm, the maximum astigmatism value of the foveal projection is (−0.02*d) D/mm+0.71 D,
and wherein,
in an area covered by the para-foveal projection along the progression path, the maximum astigmatism value is less than 0.53 D, and if the lens addition is different than 2.00 D, the astigmatism value is $$k*\text{Add}*0.53 \text{ D},$$

being Add the lens addition and k a constant being 0.5 and
if the progression path is shorter than 15 mm, the maximum gradient of astigmatism value of the para-foveal projection is (−0.07*d) D/mm+1.58 D,
if the progression path is larger than 15 mm, the maximum gradient of astigmatism value of the para-foveal projection is (−0.02*d) D/mm+0.83 D.

Furthermore, in a lens region determined by the intersection of a 45° aperture angle cone with its apex on the eye principal plane and its center placed at the lens fitting point, the absolute value of the difference of the maximum values of gradient of astigmatism in each side of the progression path is lower than 0.06 D/mm, and if the lens addition is different than 2.00 D, the difference of maximum values of gradient of astigmatism in each side of the progression path is lower than $$k*\text{Add}*0.06 \text{ D/mm}$$

being Add the lens addition and k a constant being 0.5 and if the progression path is different than 15 mm, the difference of maximum values of gradient of astigmatism in each side of the progression path is lower than (−0.01*d) D/mm²+0.21 D/mm.

Preferably, in a lens region determined by the intersection of a 45° aperture angle cone with its apex on the eye principal plane and its center placed at the lens fitting point, the maximum value of the gradient of astigmatism is lower than 0.34 D/mm, and if the lens addition is different than 2.00 D, the maximum value of the gradient of astigmatism is lower than $$k*\text{Add}*0.34 \text{ D/mm}$$

being Add the lens addition and k a constant being 0.5 and
if the progression path is shorter than 15 mm, the maximum value of the gradient of astigmatism is lower than (−0.07*d) D/mm²+1.39 D/mm, whereas if the progression path is larger than 15 mm, the maximum value of the gradient of astigmatism is lower than (−0.02*d) D/mm²+0.64 D/mm.

Also preferably, in a lens region determined by the intersection of a 45° aperture angle cone with its apex on the eye principal plane and its center placed at the lens fitting point, the maximum value of the astigmatism is lower than 1.60 D, and if the lens addition is different than 2.00 D, the maximum value of astigmatism is lower than $$k*\text{Add}*1.60 \text{ D}$$

being Add the lens addition and k a constant being 0.5 and
if the progression path is shorter than 15 mm, the maximum value of the astigmatism is lower than (−0.05*d) D/mm+2.35 D, whereas if the progression path is larger than 15 mm, the maximum value of the astigmatism is lower than (−0.03*d) D/mm+2.05 D.

BRIEF DESCRIPTION OF THE DRAWINGS

For a better understanding the above explanation and for the sole purpose of providing an example, some non-limiting drawings are included that schematically depict a practical embodiment.

DESCRIPTION OF PREFERRED EMBODIMENTS

We have realized that it is possible to optimize the optical properties of certain key lens areas, according to specific metrics that we will describe, which quantify optical properties in the areas of the lens related to the parts of the retina where images are formed. Surprisingly, progressive lenses optimized according to these metrics provide maximum visual acuity and do not compromise the overall lens performance. More importantly, we can improve the optical quality of the progressive lenses obtained according to this method and enhance the degree of satisfaction of progressive lenses users.

The progressive lens according to the present invention overcomes the drawbacks of common progressive lenses, providing the following characteristics simultaneously:

I. optimum foveal vision characterized by very low values of astigmatism and gradient of astigmatism, in the area of the lens that corresponds to the foveal projection on the lens surface along the progression path.

II. optimum quality in dynamic vision activities related to para-foveal vision, particularly when reading, thanks to the minimization of the values of astigmatism and gradient of astigmatism in the area of the lens that corresponds to the para-foveal projection on the lens surface along the progression path.

III. enhanced peripheral vision comfort thanks to a reduction of the maximum of astigmatism and of gradient of astigmatism in a cone of 45° aperture projected in the lens and focusing in the peripheral retina IV. balanced optical symmetry in peripheral vision, characterized by a minimum difference in the maximum of gradient of astigmatism in the peripheral areas of the lens within nasal and temporal sides of the progression path in a cone of 45° aperture angle projected onto the lens surface corresponding to the mid-peripheral retina field of view.

Figure 1:
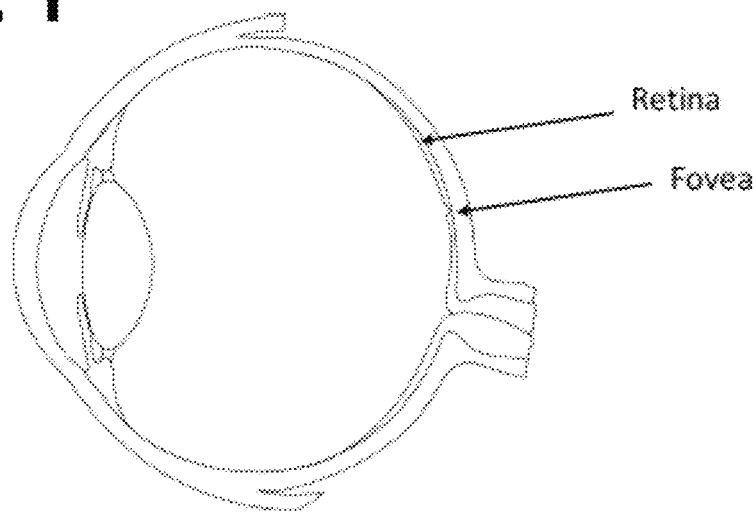
FIG. 1 is an overview of an eye structure.
Figure 2:
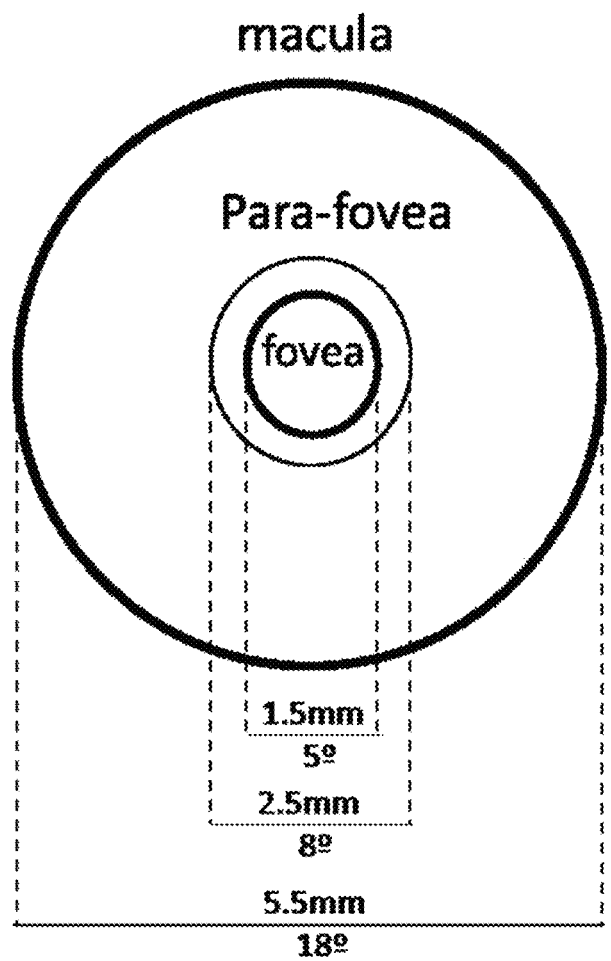
FIG. 2 shows the fovea, para-fovea and macular dimensions.
Figure 3A:
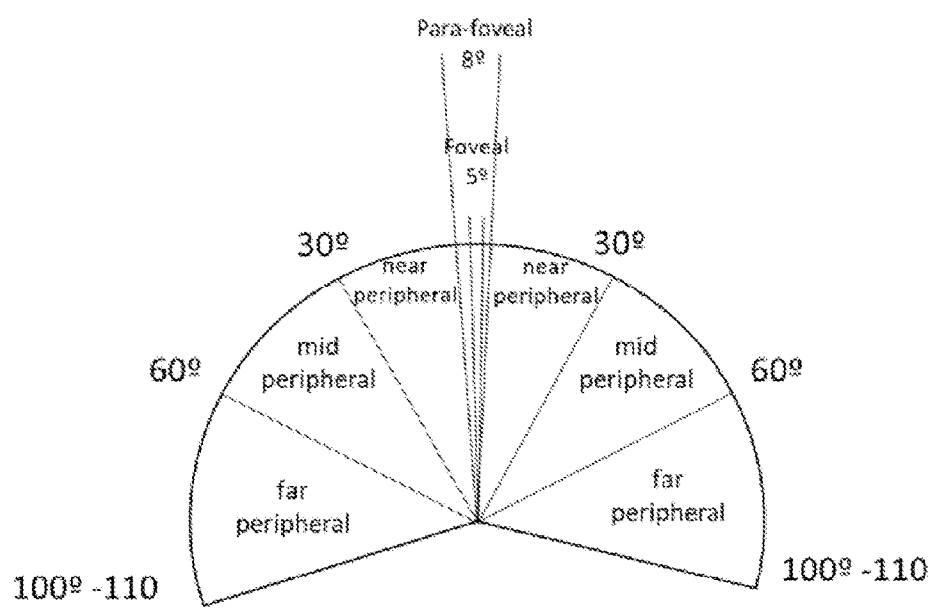
FIG. 3a shows a projection of the different vision sensitive structures, with foveal, para-foveal and peripheral vision of an average human eye.
Figure 3B:
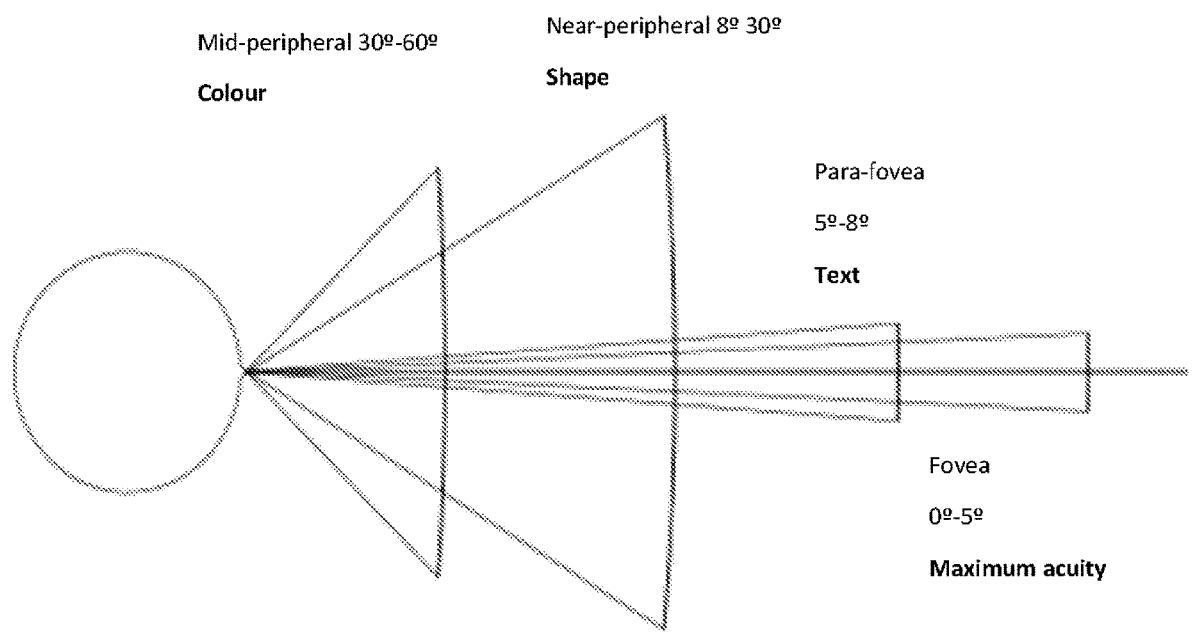
FIG. 3b shows the angular range and specialized stimuli perception of eye structures: foveal, para-foveal, near-peripheral and mid-peripheral.
Figure 4:
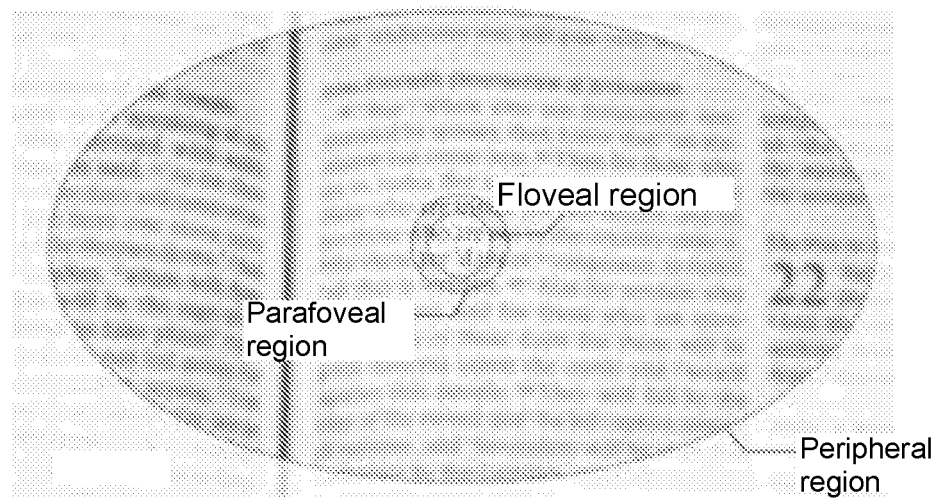
FIG. 4 shows the foveal and parafoveal regions as projected in the viewing field in reading activities.

According to the eye retinal physiology, three concentric circumferences that correspond to fovea, para-fovea and macula regions are identified. The area outside the macula is responsible for peripheral vision and is composed of near (18° to 30°), mid (30° to 60°) and far peripheral (>60°) as shown in FIGS. 3a and 3b.

When the emmetropic eye is oriented towards an object its image is perfectly formed in the fovea, whereas for a non-emmetropic eye, a corrective lens is required to focus the image on the fovea. In this last case we can identify the areas of the lens that are responsible for the projection of the image onto the fovea. For progressive lenses, these areas are the ones in the far-vision zone, near vision zone and zones in the nearby of the progression path, so we can evaluate the optical parameters in these areas and particularly the projection of the fovea all along the progression path. The same is valid for para-fovea and the peripheral retina areas.

Boundaries of each retinal area are traced along the view path on the lens surface. For fovea for instance, this projection is the intersection with the internal lens surface of the cone of the foveal aperture (5° aperture angle approx.), with its apex lying in the eye principal plane as defined in paraxial optics, and its center in the line of sight. By considering standard data for eye radius (25 mm) and vertex distance (12 mm)—known as the distance from cornea to the back surface of the progressive lens—the projection on the lens of the fovea, para-fovea and mid periphery (up to 45°) is obtained.

Figure 5:
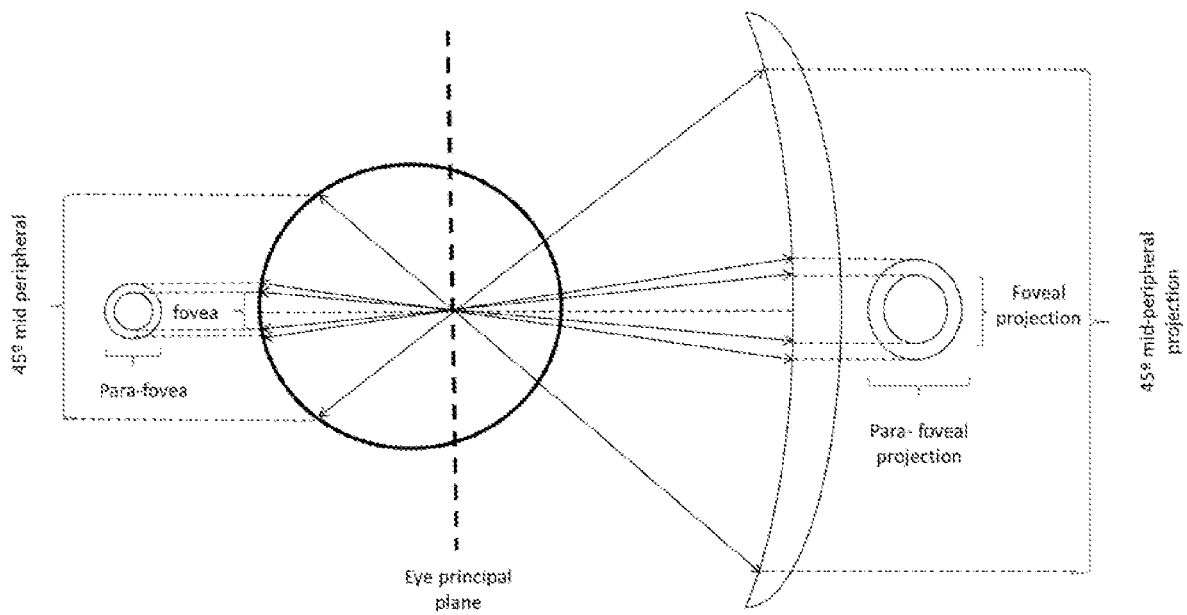
FIG. 5 shows a projection at the lens surface of the foveal, para-foveal and 45° mid-peripheral regions.

This projection is in the form of three concentric circumferences of diameter of e.g. 1.75 mm, 2.72 mm and 38.67 mm for the projection of the fovea, para-fovea and mid periphery, respectively (FIG. 5).

If the as-worn lens position is accurately known for a given spectacles in its wear position for a specific user (lens pantoscopic angle, vertex distance and lens curvature) the calculations will provide some differences in radii that can be considered instead of the standard radii provided above, but there will be no significant differences in the sizes projected cones of the fovea, para-fovea and mid periphery.

The invention optimizes simultaneously the optical quality of the progressive lens in areas which require most visual acuity, particularly in the fovea, where maximum visual acuity is achieved, and para-fovea which has an important role in reading activities. We call this high vision acuity metric or "Acuity metric", whereas a second group of metrics related to peripheral vision quality, for which motion perception has a key role, is called "Peripheral metric".

Metrics developed are defined in order to evaluate the relevant optical properties of progressive lenses (astigmatism and gradient of astigmatism). The metrics relate, according to certain physiologic data, the performance of optical functions in the lens region where these parameters are studied. Each metric is associated with a threshold value which describe the performance of the lenses.

For multipurpose progressive lenses, the corridor length is the vertical distance from the fitting cross to the near vision point and are typically from 12 to 20 mm or from 10 mm to 22 mm. Both metrics should be calculated for a whole progressive lens range, this is, considering all progression corridor lengths (typically from 10 to 22 mm) and all different power additions (from 0.75 D up to 3.75 Diopters). For simplicity, we will provide data for a "reference" progressive lens of addition 2.0 D and standard corridor length (the near vision point situated 15 mm above the fitting cross), and later we provide indication of how to proceed to determine the limited values for power addition values and corridor lengths different from the standard ones. For multipurpose progressive lens the optical power 4 mm above the fitting cross is defined to be the point where the prescription value of the far vision can be measured, and the addition is defined as difference of optical power between that point and the one at the near vision point.

However, since occupational lenses do not cover the full range of vision distances, this addition definition could not be true. Consequently, when the Acuity or Peripheral metrics described above need to be applied to occupational lenses, a new corridor length and addition value will be defined. For these lenses, we will not consider the far vision power point at 4 mm above the fitting cross. Instead, we will identify a point where the minimum optical power is reached along the progression path and, in particular, from the fitting cross towards the upper part of the frame, and the corridor length will be calculated as the distance from 4 mm below that point down to the near vision point. In addition, the considered addition for an occupational progressive will be calculated as the difference between the power at that far vision point and the power on the near vision point.

Table 1 shows the maximum preferable values of the Acuity metrics. Values are specified for a "reference" progressive lens.

TABLE 1 maximum preferable values of "Acuity" metrics
(for a standard progressive lens of addition 2.0 D and
near vision point situated 15 mm above the fitting cross)

| Acuity Metric: Part of the retina that is projected along the progression path | Maximum value of astigmatism for "Acuity" metric (D) | Maximum value of gradient of astigmatism for "Acuity" metric (D/mm) |
| --- | --- | --- |
| Fovea | 0.41 | 0.27 |
| Para-fovea | 0.53 | 0.29 |

The invention also provides a second metric identified as Peripheral metric that relate to peripheral vision quality. Table 2 shows the maximum preferable values of the Peripheral metric for a "reference" progressive lens.

Figure 6A:
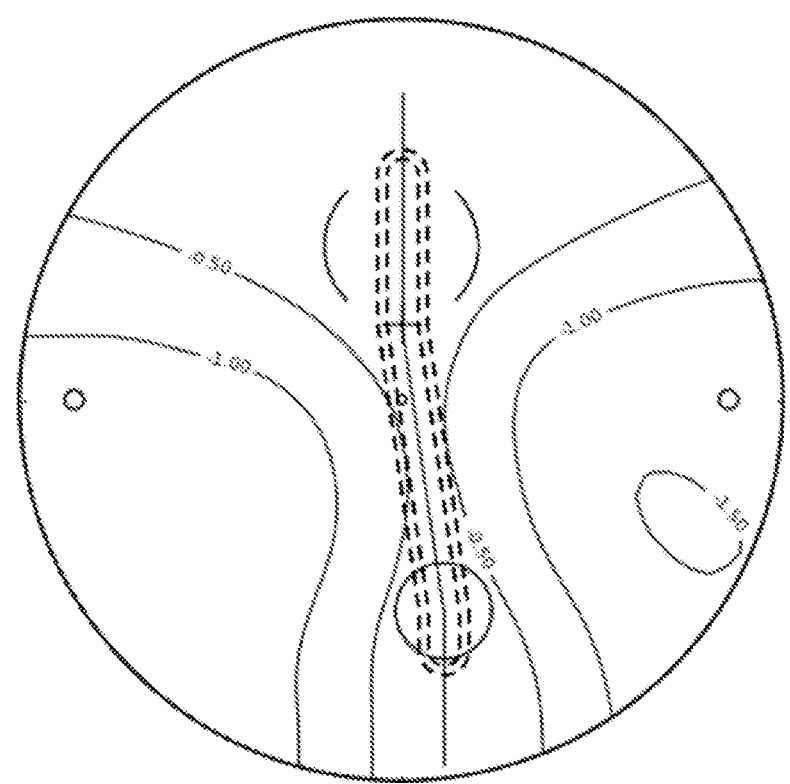
FIG. 6a shows foveal and para-foveal projected areas along the lens progression path from 4 mm above the fitting cross to the near vision point (foveal projection is represented by the inner dotted line and para-foveal projection is represented by the external dotted line)
Figure 6B:
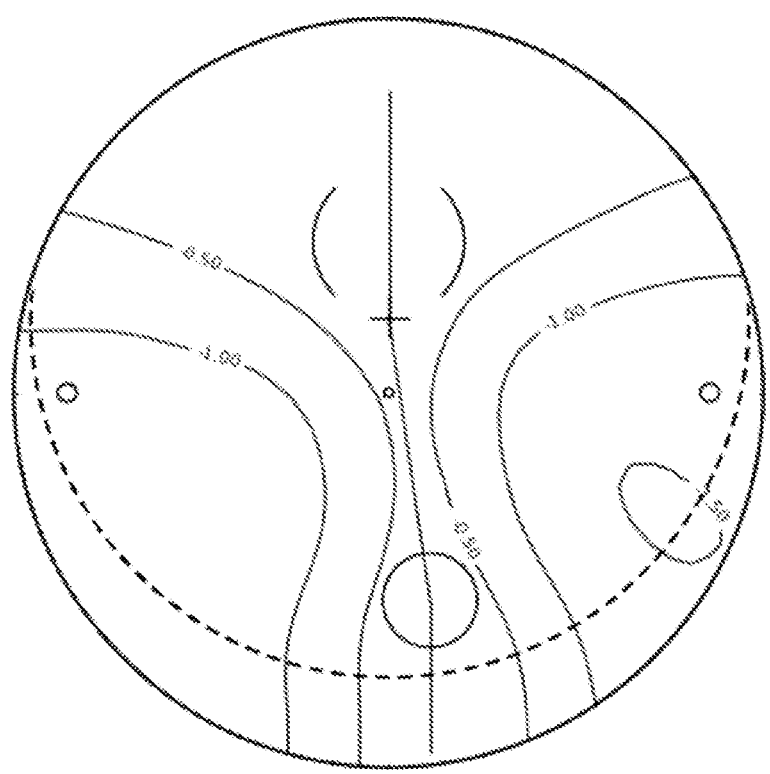
FIG. 6b shows a projection in the lens surface of the 45° mid-peripheral zone with center in the lens fitting cross represented by a dotted line.
Figure 7:
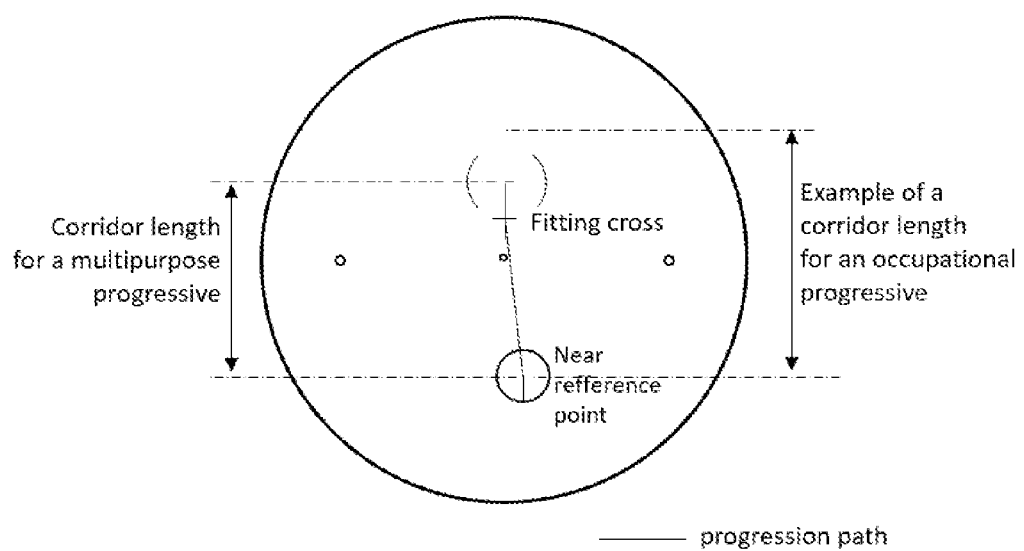
FIG. 7 shows a progression path of a progressive lens showing the fitting cross (cross), the near vision zone (circle) and the line that connects showing the power variation path.

Definitions Relevant to the Peripheral Metrics:

The 45° mid-peripheral projection is the intersection with the lens internal surface of a 45° aperture cone, the cone apex lying on the eye principal plane—as defined in paraxial optics—and the cone base centered at the lens fitting cross. The dimensions of this area depend on the back-vertex distance, but typically is 1100 mm$^2$. (FIG. 6b, dotted line).

The maximum value of astigmatism according to the peripheral metric is the absolute maximum of astigmatism in the lens area determined by the 45° mid-peripheral projection.

The maximum value of gradient of astigmatism according to the peripheral metric is the absolute maximum value of gradient of astigmatism in the lens area determined by the 45° mid-peripheral projection.

The Difference of nasal and temporal maxima of gradient of astigmatism is the difference of absolute maximum values detected in each side of the progression path (nasal and temporal). It is also evaluated in the 45° mid-peripheral projection.

TABLE 2 maximum preferable values of the "Peripheral metrics"
for a "standard" progressive lens of addition 2.0 D and
the near vision point situated 15 mm above the fitting cross
Peripheral Metric

| Maximum value of peripheral astigmatism (D) | Maximum value of peripheral gradient of astigmatism (D/mm) | Difference of maxima of gradient of astigmatism between nasal and temporal side of the lens (D/mm) |
| --- | --- | --- |
| 1.600 | 0.34 | 0.06 |

Determining the Values of the Metrics for Addition Value Different than 2.0 Diopters:

The maximum preferable values of the metrics "Acuity" and "Peripheral" for a progressive lens of addition different from 2.0 D are calculated proportionally (if the progression path has the same value, otherwise see next chapter). For example, the maximum preferable values of the metrics "Acuity" for a progressive lens of addition 1.00 D are half of values of Table 1 and the maximum preferable values of the metrics "Acuity" for a progressive lens of addition 3.0 D are 1.5 times values of Table 1. In a similar way, values for the metrics "Peripheral", can be calculated for addition different than 2.0 D using values of Table 2 in the same way.

Determining the Values of the Metrics for Different Length of the Corridor Length:

Due to different requirements of the final user or due to larger/shorter corridor length the spectacle frame dimensions may require; progressive lenses have different corridor lengths.

This distance is normally in the range from 12 mm to 18 mm, or from 10 mm to 22 mm.

We consider d=distance of the progression path defined as the distance from fitting cross (FC) to near vision point (NV) and express this distance in millimeters. If this distance is different from 15 mm, then we shall modify the metrics according to the following rules:

Correction for Addition Different than 2.0 D in Acuity Metric and in Peripherical Metric—the New Metric Value is $$k*\text{Add}*m$$

being Add the lens addition, k a constant being 0.5 and m being the metric value for addition=2.0 D.

Correction for Corridor Different than 15 mm in Acuity Metric:

The maximum of astigmatism must be modified according to the length of the corridor (noted as "d") in the following way:

a) for foveal projection:
for distances smaller than 15 mm: (−0.03*d) D/mm+0.86 D
for distances larger than 15 mm: (−0.02*d) D/mm+0.71 D
We remark that −0.03*15+0.86=−0.02*15+0.71=0.41 (i.e. both lines joins in the point d=15, maximum of astigmatism=0.41 D).

b) for para-foveal projection:
for distances smaller than 15 mm: (−0.07*d) D/mm+1.58 D
for distances larger than 15 mm: (−0.02*d) D/mm+0.83 D
We remark that −0.07*15+1.58=−0.02*15+0.83=0.53 D (i.e. both lines joins in the point d=15, maximum of astigmatism=0.53 D).

Maximum of gradient of astigmatism must be modified according to the length of the corridor (noted as "d"):
a) for foveal projection:
for distances smaller than 15 mm: (−0.04*d) D/mm$^2$+0.87 D/mm for distances larger than 15 mm: $(-0.01*d)$ D/mm$^2$+0.42 D/mm We remark that $-0.04*15+0.87=-0.01*15+0.42=0.27$ D/mm (i.e. both lines joins in the point d=15, maximum of the gradient of astigmatism=0.27 D/mm).

b) for para-foveal projection:

for distances smaller than 15 mm: $(-0.08*d)$ D/mm$^2$+1.49 D/mm for distances larger than 15 mm: $(-0.01*d)$ D/mm$^2$+0.44 D/mm We remark that $-0.08*15+1.49=-0.01*15+0.44=0.29$ D/mm (i.e. both lines join in the point d=15, maximum of gradient of astigmatism=0.29 D/mm).

Correction for Corridor Different than 15 mm in Peripheral Metric:

The maximum of astigmatism in the region comprised by the 45° mid-peripheral projection must be modified according to the length of the corridor "d":

for distances smaller than 15 mm: $(-0.05*d)$ D/mm+2.35 D, for distances larger than 15 mm, $(-0.03*d)$ D/mm+2.05 D We remark that $-0.05*15+2.35=-0.03*15+2.05=1.6$ D (i.e. both lines join in the point d=15, maximum astigmatism value is =1.6 D).

Maximum of gradient of astigmatism in the region comprised by the solid angle of 45° centered at the fitting point must be modified according to the length of the corridor "d":

for distances smaller than 15 mm: $(-0.07*d)$ D/mm$^2$+1.39 D/mm, for distances larger than 15 mm: $(-0.02*d)$ D/mm$^2$+0.64 D/mm We remark that $-0.07*15+1.39=-0.02*15+0.64=0.34$ D/mm (i.e. both lines joins in the point d=15, maximum gradient of astigmatism value is =0.34 D).

Maximum of the difference of the maximum of gradient of astigmatism between nasal and temporal side of the lens, in the region comprised by the solid angle of 45° centered at the fitting point must be modified according to the length of the corridor "d":

for distances other than 15 mm: $(-0.01*d)$ D/mm$^2$+0.21 D/mm,

Correction for Addition Different than 2.0 D and Corridor Different than 15 mm in Acuity Metric and in Peripherical Metric is a Combination of Two Previous Modifications (for Addition and for Corridor).

Metrics related to the fovea, para-fovea and peripheral retina can be applied also independently or in any combination, with the final aim to obtain an optimized vision for activities that require the highest acuity (foveal vision), dynamic or reading activities (para-foveal), and motion perception (peripheral vision).

EXAMPLES OF LENSES

Example 1

Figure 8A:
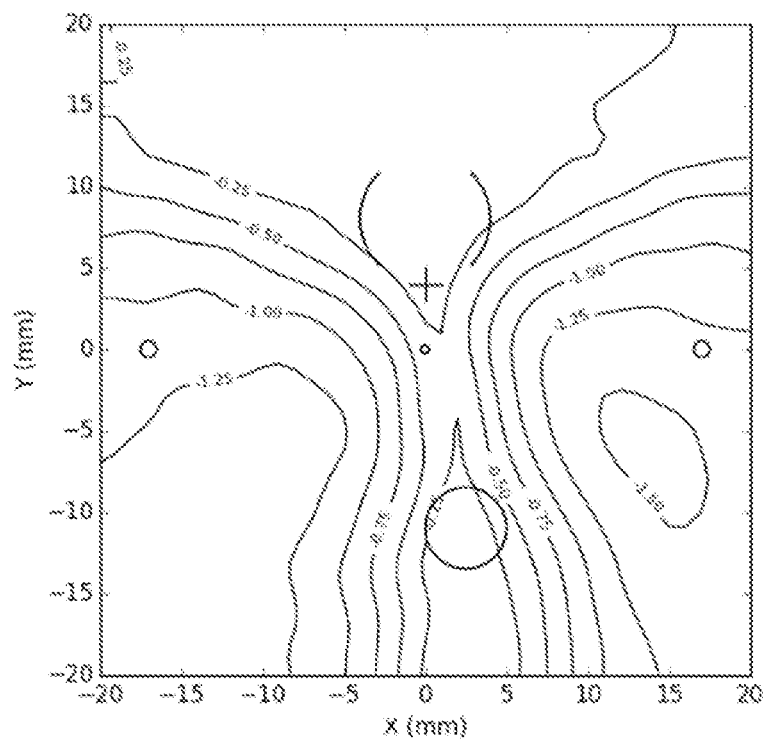
FIG. 8a shows a map of astigmatism and FIG. 8b a map of optical power of the lens according to example 1.
Figure 8B:
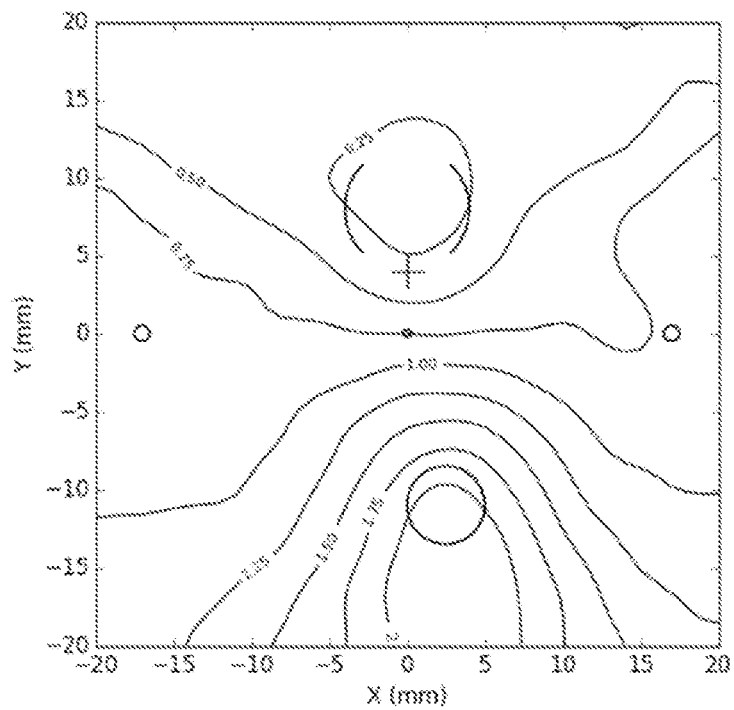

An optical lens element according to the present invention was designed having 2.00 D addition power in the lower or near viewing zone and standard corridor length (the near vision point situated 15 mm below the fitting cross). The contour plots of surface astigmatism and mean surface power respectively for the optical lens are given in FIGS. 8a and 8b. The design provides a relatively wide upper or distance viewing zone with the 0.5 D astigmatic contour rising towards the periphery. The lens design exhibits very low values of astigmatism along the lens progression path (0.4016 D for foveal projection and 0.5285 D for para-foveal projection). In addition, the maximum values of gradient of astigmatism along the progression path for foveal projection (0.269 D) and para-foveal projection (0.275 D) are obtained. We can see also that the maximum value of astigmatism and gradient of astigmatism for peripheral metric are below maximum values of table 2.

TABLE 3 maximum values of the metrics "type A" for the progressive lens of example 1.

| Acuity metric: Part of the retina that is projected in the progression path | Maximum value of astigmatism for metric "Acuity" (D) | Maximum value of gradient of astigmatism for metric "Acuity" (D/mm) |
|---|---|---|
| Fovea | 0.4016 | 0.269 |
| Para-fovea | 0.5285 | 0.275 |

TABLE 4 maximum values of the metrics "type B" for the progressive lens of example 1. Maximum values of optical properties according to the Peripheral Metric

| Maximum value of astigmatism for Peripheral metric (D) | Maximum value of gradient of astigmatism for Peripheral metric (D/mm) | Difference of maxima of gradient of astigmatism between nasal and temporal side of the lens (D/mm) |
|---|---|---|
| 1.557 | 0.310 | 0.035 |

Example 2

An optical lens element according to the present invention was designed having addition 2 D and a short corridor length (the near vision point situated 12 mm below the fitting cross. Since this distance is not 15 mm, values of proposed maximum of astigmatism and maximum of gradient of astigmatism in the tables are recalculated to the current corridor length. For instance, foveal projection for the lens in this case, which has a corridor length of 12 mm leads to a maximum of astigmatism value of 0.5 D:

$(-0.03*12)+0.86$ D=0.50 D, which is always greater than the measured maximum of the lens according to the invention.

TABLE 5 maximum values of the "Acuity" metrics for the progressive lens of example 2.

| Acuity metric: Part of the retina that is projected in the progression path | Maximum value of astigmatism for metric "Acuity" (D) | Maximum value of gradient of astigmatism for metric "Acuity" (D/mm) |
|---|---|---|
| Fovea | 0.431 (<0.50) | 0.317 |
| Para-fovea | 0.6132 | 0.412 |

TABLE 6 maximum values of the "Peripheral" metrics
for the progressive lens of example 2.
Maximum values of optical properties
according to the Peripheral Metric

| Maximum value of astigmatism for Peripheral metric (D) | Maximum value of gradient of astigmatism for Peripheral metric (D/mm) | Difference of maxima of gradient of astigmatism between nasal and temporal side of the lens (D/mm) |
|---|---|---|
| 1.683 | 0.412 | 0.065 |

Figure 9A:
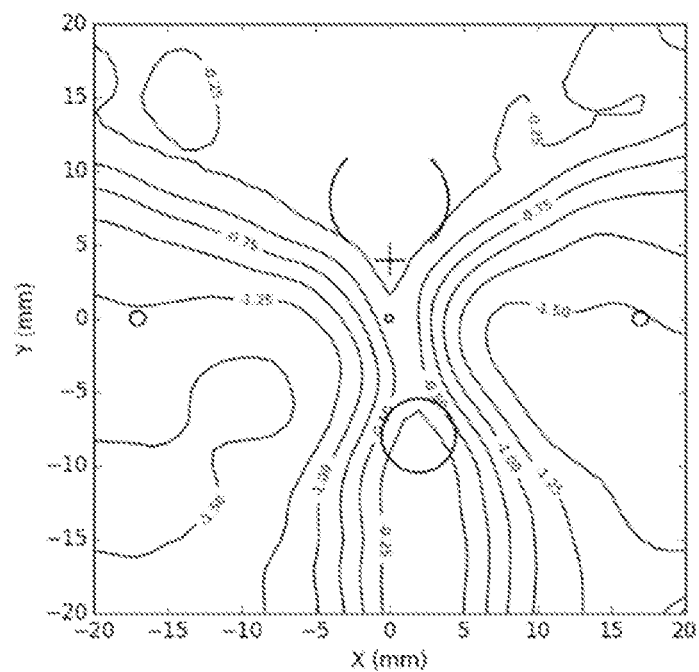
FIG. 9a shows a map of astigmatism and FIG. 9b a map of optical power of the lens according to example 2.
Figure 9B:
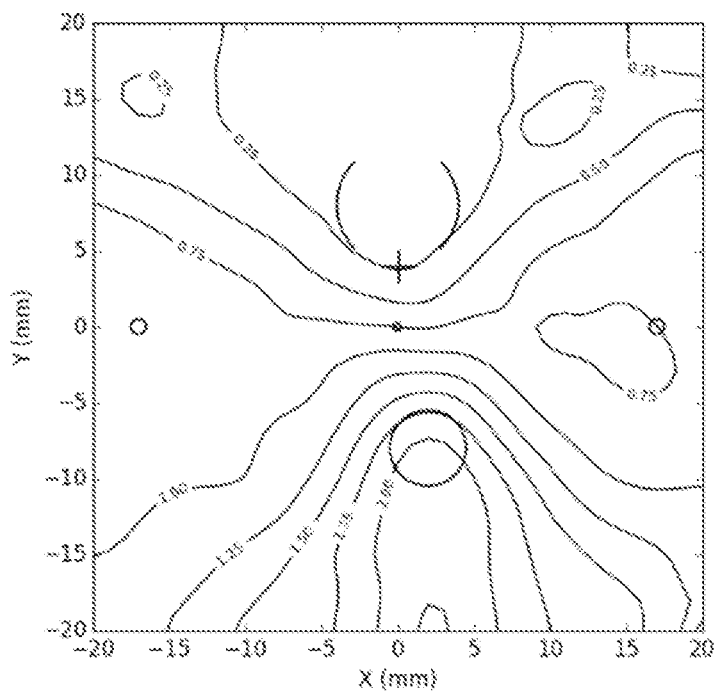

FIG. 9 shows the map of astigmatism and power of this lens. We remark that this lens has the distance between de fitting cross and the near vision point very small, i.e., has one of the shortest corridors in the market.

Example 3

Figure 10A:
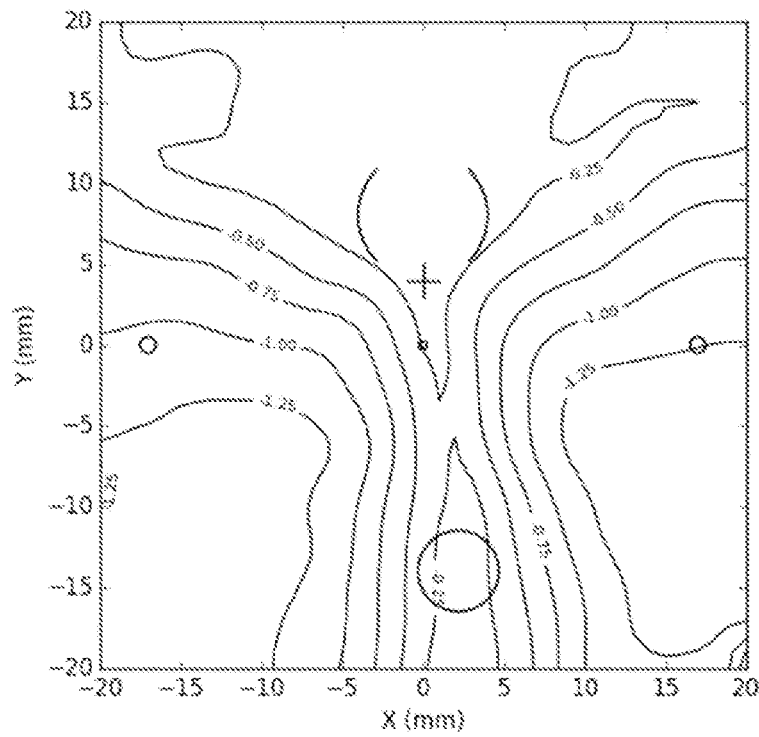
FIG. 10a shows a map of astigmatism and FIG. 10b shows a map of optical power of the lens according to example 3.
Figure 10B:
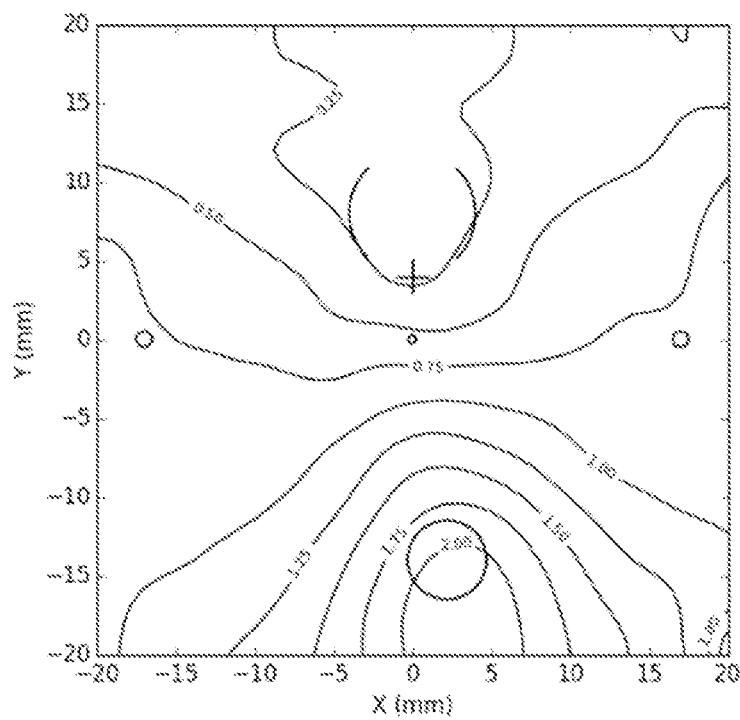

An optical lens element according to the present invention was designed having of addition 2 D with large corridor length, (the near vision point situated 18 mm below the fitting cross). FIGS. 10*a* and 10*b* shows the map of astigmatism and power of this lens.

Since this distance is not 15 mm, values of proposed maximum of astigmatism and maximum of gradient of astigmatism in the tables are recalculated to the current corridor length. For instance, foveal projection for the lens in this case, which has a corridor length of 18 mm leads to a maximum of astigmatism value of 0.35 D instead of 0.41 D:

(−0.02*18)+0.71 D=0.35 D, which is always greater than the measured maximum of the lens according to the invention as reported in table 7. The same is valid for the rest of magnitudes and metrics.

TABLE 7 maximum values of the "Acuity metrics"
for the progressive lens of example 3.

| Acuity metric: Part of the retina that is projected in the progression path | Maximum value of astigmatism for metric "Acuity" (D) | Maximum value of gradient of astigmatism for metric "Acuity" (D/mm) |
|---|---|---|
| Fovea | 0.347 (<0.35) | 0.219 |
| Para-fovea | 0.459 | 0.239 |

TABLE 8 maximum values of the "Peripheral metrics"
for the progressive lens of example 3.
Maximum values of optical properties
according to the Peripheral Metric

| Maximum value of astigmatism for Peripheral metric (D) | Maximum value of gradient of astigmatism for Peripheral metric (D/mm) | Difference of maxima of gradient of astigmatism between nasal and temporal side of the lens (D/mm) |
|---|---|---|
| 1.416 | 0.240 | 0.002 |

FIG. 10 shows the map of astigmatism and power of this lens. We remark that this lens has one of the largest corridors in the market. Despite larger corridor length are technically possible, those lenses would not be suited for most spectacle frames, since the lens will be cut and edged according to the frame boxing dimensions and eye relative position which may eliminate the near vision zone of the progressive lens.

Even though reference has been made to a specific embodiment of the invention, it is obvious for a person skilled in the art that the lens and the method described herein are susceptible to numerous variations and modifications, and that all of the details mentioned can be substituted for other technically equivalent ones without departing from the scope of protection defined by the attached claims.

The invention claimed is:

1. A progressive ophthalmic lens comprising at least one multifocal surface, in which each point of its surface is associated with an astigmatism value and a gradient of astigmatism value, the progressive ophthalmic lens including:
    a far-vision zone with a first reference point,
    a near-vision zone with a second reference point (NV),
    an intermediate vision zone with a progression path that connects the far vision zone and the near vision zone,
    a foveal projection, and
    a para-foveal projection,
and said lens defining a lens addition,
wherein
    in an area covered by the foveal projection along the progression path, a maximum astigmatism value is less than 0.41 diopters and:
    when the lens addition is different than 2.00 D, the astigmatism value is $k*\text{Add}*0.41$ D, where Add indicates the lens addition and k is 0.5 and,
    when the progression path is shorter than 15 mm, the maximum astigmatism value of the foveal projection is (−0.03*d) D/mm+0.86 D, and
    when the lens progression path is larger than 15 mm, the maximum astigmatism value of the foveal projection is (−0.02*d) D/mm+0.71 D,
and wherein
    in an area covered by the para-foveal projection along the progression path, the maximum gradient of astigmatism value is less than 0.29 D/mm, and
    when the lens addition is different than 2.00 D, the gradient of astigmatism value is $k*\text{Add}*0.29$ D/mm and
    when the progression path is shorter than 15 mm, the maximum gradient of astigmatism value of the para-foveal projection is (−0.08*d) D/mm$^2$+1.49 D/mm, whereas when the progression path is larger than 15 mm, the maximum gradient of astigmatism value of the para-foveal projection is (−0.01*d) D/mm$^2$+0.44 D/mm.

2. A progressive ophthalmic lens according to claim 1, wherein in a lens area contained in a 45° mid-peripheral projection, an absolute value of a difference of the maximum values of gradient of astigmatism in each side of the progression path is lower than 0.06 D/mm, and
    when the lens addition is different than 2.00 D, the absolute value of the difference of the maximum value of gradient of astigmatism in each side of the progression path is $k*\text{Add}*0.06$ D/mm, and
    when the progression path is different than 15 mm, the maximum absolute value of the difference of the maximum value of gradient of astigmatism in each side of the progression path is lower than $(-0.01*d)$ D/mm$^2$+ 0.21 D/mm.

3. A progressive ophthalmic lens according to claim 1, wherein in a lens area contained in a 45° mid-peripheral projection, the maximum value of the gradient of astigmatism is lower than 0.34 D/mm, and when the lens addition is different than 2.00 D, the gradient of astigmatism value is $k*$Add$*0.34$ D/mm and when the progression path is shorter than 15 mm, the maximum gradient of astigmatism value in the same area is $(-0.07*d)$ D/mm$^2$+1.39 D/mm, whereas when the progression path is larger than 15 mm, the maximum gradient of astigmatism in the same area is $(-0.02*d)$ D/mm$^2$+0.64 D/mm.

4. A progressive ophthalmic lens according to claim 1, wherein in a lens area contained in a 45° mid-peripheral projection, the maximum value of the astigmatism is lower than 1.60 D, and when the lens addition is different than 2.00 D, the maximum value of astigmatism in the same area is $k*$Add$*1.60$ D, and when the progression path is shorter than 15 mm, the maximum value of astigmatism in the same area is $(-0.05*d)$ D/mm+2.35 D, and when the lens progression path is larger than 15 mm, the maximum value of astigmatism in the same area is $(-0.03*d)$ D/mm+2.05 D.

5. A progressive ophthalmic lens comprising at least one multifocal surface, in which each point of its surface is associated with an astigmatism value and a gradient of astigmatism, the progressive ophthalmic lens including:
a far-vision zone with a first reference point,
a near-vision zone having a second reference point,
an intermediate vision zone with a progression path that connects the far vision zone and the near vision zone,
a foveal projection, and
a para-foveal projection,
and said lens defining a lens addition,
wherein
in a lens area covered by the foveal projection along the lens progression path, a maximum astigmatism value is less than 0.41 diopters,
when the lens addition is different than 2.00 D, the astigmatism value is $k*$Add$*0.41$ D, where Add indicates the lens addition and k is 0.5 and,
when the progression path is shorter than 15 mm, the maximum astigmatism value of the foveal projection is $(-0.03*d)$ D/mm+0.86 D, and
when the progression path is larger than 15 mm, the maximum astigmatism value of the foveal projection is $(-0.02*d)$ D/mm+0.71 D,
and wherein,
in an area of the multifocal surface covered by the para-foveal projection along the progression path, the maximum astigmatism value is less than 0.53 D, and when the lens addition is different than 2.00 D, the astigmatism value is $k*$Add$*0.53$ D, and when the progression path is shorter than 15 mm, the maximum astigmatism value of the para-foveal projection is $(-0.07*d)$ D/mm+1.58 D, and
when the progression path is larger than 15 mm, the maximum astigmatism value of the para-foveal projection is $(-0.02*d)$ D/mm+0.83 D.

6. A progressive ophthalmic lens according to claim 5, wherein in a lens area contained in a region determined by a 45° mid-peripheral projection, an absolute value of a difference of the maximum values of gradient of astigmatism in each side of the progression path is lower than 0.06 D/mm, and when the lens addition is different than 2.00 D, the absolute value of the difference of the maximum value of gradient of astigmatism in each side of the progression path is $k*$Add$*0.06$ D/mm, and when the progression path is different than 15 mm, the maximum absolute value of the difference of the maximum value of gradient of astigmatism in each side of the progression path is lower than $(-0.01*d)$ D/mm$^2$+ 0.21 D/mm.

7. A progressive ophthalmic lens according to claim 6, wherein in the lens area contained in a region determined by the 45° mid-peripheral projection, the maximum value of the gradient of astigmatism is lower than 0.34 D/mm, and when the lens addition is different than 2.00 D, the gradient of astigmatism value is $k*$Add$*0.34$ D/mm and when the progression path is shorter than 15 mm, the maximum gradient of astigmatism value in a region determined by the intersection of the lens with a cone having a solid angle of 45° aperture with its apex in an eye principal plane and center at a lens fitting cross, is $(-0.07*d)$ D/mm$^2$+1.39 D/mm, whereas when the progression path is larger than 15 mm, the maximum gradient of astigmatism is $(-0.02*d)$ D/mm$^2$+0.64 D/mm.

8. A progressive ophthalmic lens according to claim 7, wherein in the lens area contained in a region determined by the 45° mid-peripheral projection, the maximum value of the astigmatism is lower than 1.60 D, and when the lens addition is different than 2.00 D, the maximum value of astigmatism is $k*$Add$*1.60$ D, and when the progression path is shorter than 15 mm, the maximum value of astigmatism is $(-0.05*d)$ D/mm+2.35 D, and when the lens progression path is larger than 15 mm, the maximum value of astigmatism is $(-0.03*d)$ D/mm+2.05 D.

* * * * *